April 18, 1950          A. C. VOIGT          2,504,284
PREHEATING APPARATUS FOR MACHINE TOOLS
Filed March 27, 1947
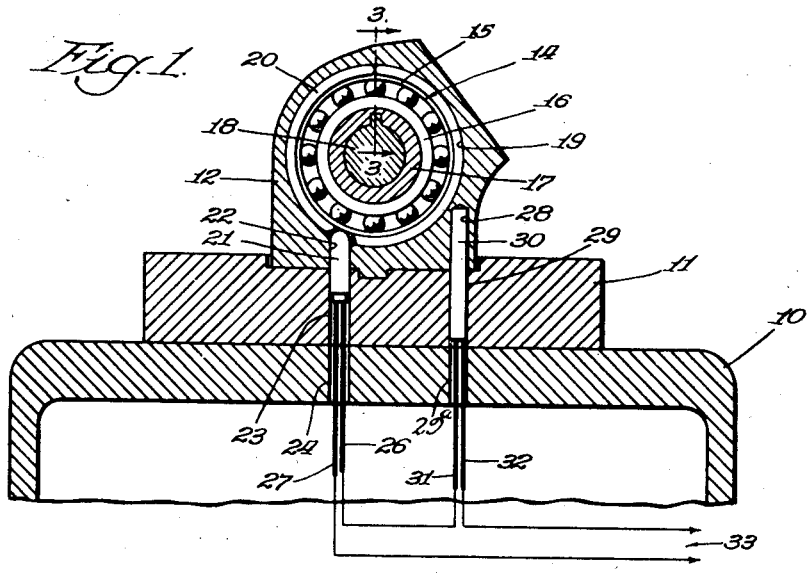
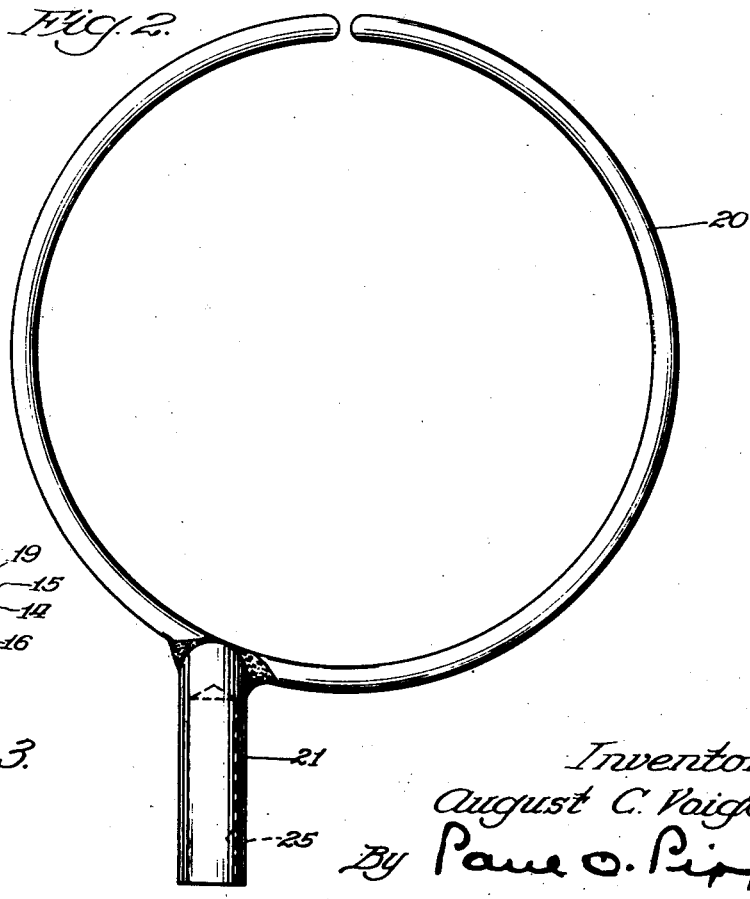
Inventor:
August C. Voigt
By Paul O. Pippel
Atty.

Patented Apr. 18, 1950

2,504,284

UNITED STATES PATENT OFFICE 2,504,284

PREHEATING APPARATUS FOR MACHINE TOOLS

August C. Voigt, Indianapolis, Ind., assignor to International Harvester Company, a corporation of New Jersey Application March 27, 1947, Serial No. 737,643

6 Claims. (Cl. 308—76)

It is the purpose of the present invention to provide apparatus for pre-heating supports, fixtures, and like elements in machine tools to overcome difficulties incident to expansion and contraction of such parts due to variations in starting and running temperatures.

In one such example of the problem encountered, it has been previously necessary to run a boring bar or the like for a considerable period prior to actual use thereof so that expansion of the different elements could be controlled. The problem is particularly acute in production where close tolerances must be held, inasmuch as the tooling employed in such production is necessarily constructed with a minimum of running or oil clearance. It is known that the temperatures in shops vary as much as 40° F. between winter and summer. The idling period necessary to bring the fixtures to operating temperature delays production. It is therefore the principal object of the present invention to provide an apparatus capable of pre-heating a fixture or support in which a rotatable element is carried so that the fixture may be placed in operation within a short period of time. Other objects of the invention are to provide such apparatus which is simple and inexpensive in construction and in which the heating element may be easily assembled and disassembled.

Other objects and features of the invention will become apparent to those skilled in the art as the disclosure of the preferred embodiment of the invention is more fully made in the following detailed description and accompanying sheet of drawings, in which:

Fig. 1 is a transverse sectional view through a fixture embodying a support, a bearing, and a boring bar, an electrical circuit being indicated diagrammatically in conjunction therewith;

Fig. 2 is an enlarged view of the heating element or ring; and

Fig. 3 is a fragmentary sectional view taken substantially on the line 3—3 of Fig. 1.

It should be understood that the disclosure herein is of a type of fixture that is only representative of several other fixtures and that the principles of the invention are not limited to the precise structure shown and described.

In Fig. 1 the reference character 10 designates a base which carries a tool fixture 11, part of which is formed as a support 12. The support 12 is provided with a circular opening 13 in which is mounted an anti-friction bearing 14 having an outer race 15 and an inner race 16. It will be understood that there may be a pair or more of similar supports such as the support 12 and each carries an anti-friction bearing similar to the bearing 14, whereby the supporting structure or fixture may journal a sleeve, such as that shown at 17 in Fig. 1, within which is carried a machine tool such as the boring bar indicated at 18 in Fig. 1. The boring bar 18 is, of course, only one of several types of rotatable elements that could be similarly supported in a comparable fixture.

The support 12 is provided with an annular recess 19 (Figs. 1 and 3) concentric with and encircling the outer race ring 15 of the bearing 14. This annular recess accommodates or receives a heating element which is herein disclosed as assuming the form of a split ring 20. It has been found that a suitable ring may be formed of copper. The ring has secured thereto, as by silver solder or the like, a cylindrical projection 21 which fits within a bore 22 in the support 12. This bore is in communication with aligned bores 23 and 24 in the element 11 and base 10 respectively. The portion 21 on the ring 20 is bored as at 25 and may receive an electrical resistance element, for example, connected in an electrical circuit by means of a pair of leads 26 and 27. The resistance element may be of any conventional type and it is deemed not necessary to illustrate same in detail here.

The support 12 is provided with a second bore 28, disposed in the support at a point substantially tangent to the ring 20. The element 11 is provided with a bore 29 aligned with the bore 28 and the base 10 is bored at 29a in alignment with the bores 28 and 29. The bores 28 and 29 receive a thermostatic control element indicated generally by the numeral 30, which element may be of any conventional construction. This element is connected by a pair of electrical leads 31 and 32 to an electrical circuit including the leads 26 and 27 of the heating ring 20. The source of electrical energy to which the circuit is connected may be any available source of electric potential, designated generally at 33 in the diagrammatic illustration in Fig. 1.

In the operation of a machine tool equipped with the heating apparatus described above, current is supplied to the heating ring 20. Because of the position of the ring with respect to the support 12 and bearing 14 the parts are quickly pre-heated prior to actual operation of the tool. The thermostatic control 30 is responsive to variations in temperature in the associated parts and operates to control the supply of current to the ring 20.

Other applications of the principles of the invention as herein disclosed by way of example will undoubtedly occur to those skilled in the art, as will various alterations and modifications in the provided structure illustrated, all of which changes may be made without departing from the spirit and scope of the invention as set forth in the appended claims.

What is claimed is:

1. Apparatus of the class described, comprising: a support; means providing a circular opening in the support; means providing an annular recess in one face of the support generally encircling the opening; means forming a first bore in the support in communication with the recess; a rotatable element carried by the support in the opening therein; a generally circular heating element carried in the aforesaid annular recess and substantially encircling the rotatable element, and including a portion entering the aforesaid first bore; electrical means including a connection to said portion for supplying current to the heating element; means forming a second bore in the support at a position therein generally tangent to the heating element; and a thermostatic device carried in the second bore and responsive to temperature variations in the rotatable element to control the current to the heating element.

2. Apparatus of the class described, comprising: a support; means providing a circular opening in the support; a rotatable element carried by the support in the opening therein; a generally circular heating element in the form of a split ring substantially encircling the rotatable element; means carried by the support, connected to the heating element, and including a connection to a source of electrical energy to heat the heating element; and means including a thermostatic control carried by the support in close proximity to the rotatable element therein and responsive to variations in temperatures of the rotatable element to control the heating element.

3. Apparatus of the class described, comprising: a support; means providing a circular opening in the support; means providing an annular recess in one face of the support, concentric with and encircling the opening; a rotatable element carried by the support in the opening therein; a generally circular heating element in the form of a split ring contained in the annular recess and substantially encircling the rotatable element; means carried by the support, connected to the heating element, and including a connection to a source of electrical energy to heat the heating element; and means including a thermostatic control carried by the support in close proximity to the rotatable element therein and responsive to variations in temperatures of the rotatable element to control the heating element.

4. Apparatus of the class described, comprising: a support; means providing a circular opening in the support; a rotatable element carried by the support in the opening therein; means providing an annular recess in one face of the support and generally encircling said opening; means forming a bore in communication with said recess; a generally circular heating element in the form of a split highly conductive ring disposed so as to substantially encircle the rotatable element and be carried in the annular recess; said element having an angularly disposed portion that extends generally radially away from said ring and is further provided with a longitudinally extending recess in the interior thereof; said portion being adapted for positioning within said bore; and electrical heating means, including an electrical resistance heating element disposed within said longitudinal recess and in heat exchange relation with said portion, and an electrical connection therefrom to a source of electrical energy for heating said element.

5. Apparatus of the class described, comprising: a support; means providing a circular opening in the support; a rotatable element carried by the support in the opening therein; means providing an annular recess in one face of the support and generally encircling said opening; means forming a bore in communication with said recess; a generally circular heating element in the form of a split highly conductive ring disposed so as to substantially encircle the rotatable element and be carried in the annular recess; said element having an angularly disposed portion that extends generally radially away from said ring and is adapted for positioning within said bore; and electrical heating means, including an electrical resistance heating element disposed in heat exchange relation with said angularly disposed portion, and an electrical connection therefrom to a source of electrical energy for heating said element.

6. Apparatus of the class described, comprising: a support; means providing a circular opening in the support; a rotatable element carried by the support in the opening therein; means providing an annular recess in one face of the support and generally encircling said opening; means forming a first bore in communication with said recess; a generally circular heating element in the form of a split highly conductive metallic ring disposed so as to substantially encircle the rotatable element and be carried in the annular recess; said element having an angularly disposed portion that extends generally radially away from said ring and is further provided with a longitudinally extending recess in the interior thereof; said portion being adapted for positioning within said first bore; electrical heating means, including an electrical resistance heating element disposed within said longitudinal recess and in heat exchange relation with said portion, and an electrical connection therefrom to a source of electrical energy for heating said element; means forming a second bore in the support at a position therein generally tangent to the circular heating element; and a thermostatic device carried in the second bore in close proximity to said circular heating element that is responsive to temperature variations in the rotatable element to control the current to the electrical heating element.

AUGUST C. VOIGT.

REFERENCES CITED

The following references are of record in the file of this patent:

UNITED STATES PATENTS

| Number | Name | Date |
|---|---|---|
| 2,352,206 | Kendall | June 27, 1944 |